United States Patent
Ausseresse (10) Patent No.: US 10,355,610 B2
(45) Date of Patent: Jul. 16, 2019

(54) LLC POWER CONVERTER AND SWITCHING METHOD THEREOF

(71) Applicant: Infineon Technologies Austria AG, Villach (AT)

(72) Inventor: Pierrick Ausseresse, München (DE)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 0 days.

(21) Appl. No.: 15/853,153

(22) Filed: Dec. 22, 2017

(65) Prior Publication Data

US 2018/0183343 A1  Jun. 28, 2018

Related U.S. Application Data

(60) Provisional application No. 62/438,932, filed on Dec. 23, 2016.

(51) Int. Cl.
   *H02M 3/335* (2006.01)
   *H02M 3/337* (2006.01)
   *H02M 1/32* (2007.01)
   *H02M 1/00* (2006.01)

(52) U.S. Cl.
   CPC ..... *H02M 3/33576* (2013.01); *H02M 3/3376* (2013.01); *H02M 1/32* (2013.01); *H02M 2001/0009* (2013.01); *H02M 2001/0058* (2013.01); *Y02B 70/1491* (2013.01)

(58) Field of Classification Search
   CPC .............. H02M 3/33576; H02M 1/32; H02M 2001/0009
   See application file for complete search history.

(56) References Cited

U.S. PATENT DOCUMENTS

| | | | | |
|---|---|---|---|---|
| 2003/0067728 A1* | 4/2003 | Feldtkeller | ....... | H03K 17/08122 361/100 |
| 2009/0273957 A1* | 11/2009 | Feldtkeller | .............. | H02M 1/38 363/98 |
| 2010/0079186 A1* | 4/2010 | Zannoth | ............... | H03K 17/166 327/333 |
| 2011/0187335 A1* | 8/2011 | Grakist | ................... | H02M 1/32 323/271 |
| 2015/0365084 A1* | 12/2015 | Hirler | ................. | H03K 17/165 327/382 |
| 2016/0087543 A1* | 3/2016 | Jin | .......................... | H02M 1/38 363/21.03 |
| 2017/0110973 A1* | 4/2017 | Chen | ................ | H02M 3/33546 |

* cited by examiner

*Primary Examiner* — Jue Zhang
*Assistant Examiner* — Bart Iliya
(74) *Attorney, Agent, or Firm* — Slater Matsil, LLP (57) ABSTRACT

A method includes turning off a high-side switch of an inductor-inductor-capacitor (LLC) power converter; detecting a first current pulse at a gate of a low-side switch of the LLC power converter after turning off the high-side switch; and turning on the low-side switch of the LLC power converter after detecting the first current pulse.

28 Claims, 6 Drawing Sheets

Fig. 5

LLC POWER CONVERTER AND SWITCHING METHOD THEREOF

PRIORITY CLAIM AND CROSS-REFERENCE

This application claims priority to U.S. Provisional Patent Application No. 62/438,932, filed Dec. 23, 2016, entitled "LLC Power Converter and Switching Method Thereof," which application is hereby incorporated by reference in its entirety.

TECHNICAL FIELD

An embodiment of the invention relates generally to electronic power conversion and methods, and more particularly to the structure and switching method for an inductor-inductor-capacitor (LLC) converter.

BACKGROUND

Switching converters are widely used in the field of power conversion. A switching converter includes at least one switch that is configured to generate, e.g., a pulse-width modulated (PWM) voltage from an input voltage, and a rectifier arrangement that receives the PWM voltage and generates an output voltage to be supplied to a load. Usually the rectifier arrangement includes at least one inductive storage element, such as a choke, and at least one capacitive storage element, such as a capacitor. The PWM voltage is generated by switching the switching element on and off in accordance with a PWM drive signal. The PWM drive signal is provided by a controller dependent on the output voltage. The controller is configured to vary, e.g., the duty cycle and/or the switching frequency of the PWM drive signal in order to maintain a desired output voltage.

LLC converters, sometimes referred to as resonant LLC converters or LLC power converters, have been widely used recently due to desirable features such as high efficiency, low electro-magnetic interference (EMI), and high power density. A characteristic feature of an LLC converter is a resonant circuit on the primary side of the converter that includes a resonant capacitor, a resonant inductor, and the magnetizing inductance of the transformer. During operation, the amount of energy transferred by the LLC converter may be controlled by controlling the switching frequency at or about the resonant frequency of the resonant circuit.

SUMMARY OF THE INVENTION

In accordance with an embodiment, a method includes turning off a high-side switch of an inductor-inductor-capacitor (LLC) power converter; detecting a first current pulse at a gate of a low-side switch of the LLC power converter after turning off the high-side switch; and turning on the low-side switch of the LLC power converter after detecting the first current pulse.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a power conversion system that includes an LLC power converter. Embodiments of the present invention may also be applied to other types of electronic power conversion devices and other power conversion architectures.

During operation of an LLC converter (e.g., a half-bridge LLC power converter), the switching transistors (e.g., the high-side transistor and the low-side transistor) of the LLC converter are turned on and off alternately. LLC power converters often operate in the inductive mode. Capacitive mode operation is usually problematic for conventional LLC converters due to problems such as reverse recovery of the body diodes of the switching transistors, which may cause device failure. In various embodiments, the presently disclosed method of switching an LLC power converter allows for operation of the LLC converter in capacitive mode without the risk of reverse recovery. In particular, after turning off the high-side transistor, a current pulse is detected at the gate of the low-side transistor that corresponds to an electrical current flowing into the gate of the low-side transistor. After detecting the current pulse, the low-side transistor may be safely turned on without the risk of reverse recovery of the body diode of the high-side transistor.

A switched-mode power converter (also referred to as a "power converter" or "regulator") is a power supply or power processing circuit that converts an input voltage waveform into a specified output voltage waveform. DC-DC power converters convert a DC input voltage which may be time varying into a DC output voltage. Controllers associated with the power converters manage an operation thereof by controlling conduction periods or switching frequencies of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a switching frequency of the power switches of a resonant power converter. As voltage or current for systems, such as a microprocessor powered by the power converter, dynamically change (e.g., as a computational load on a load microprocessor changes), the controller is configured to dynamically increase or decrease the switching frequency of the power switches therein to maintain an output characteristic, such as an output voltage, at a desired value. A controller for a power converter is generally formed as an integrated circuit with conductive pins that are soldered or otherwise electrically bonded to a printed wiring board in an end product.

To provide the voltage conversion and regulation functions, the power converters include active power switches such as metal-oxide semiconductor field-effect transistors (MOSFETs) that are coupled to the input voltage source and periodically switch a reactive circuit element such as an inductor to the voltage source at a switching frequency that may be on the order of 100 kHz or higher. To provide a DC output voltage, the power converters include diodes to provide a rectification function. When high power conversion efficiency is desired, synchronous rectifiers may be substituted for the rectifying diodes.

Figure 1:
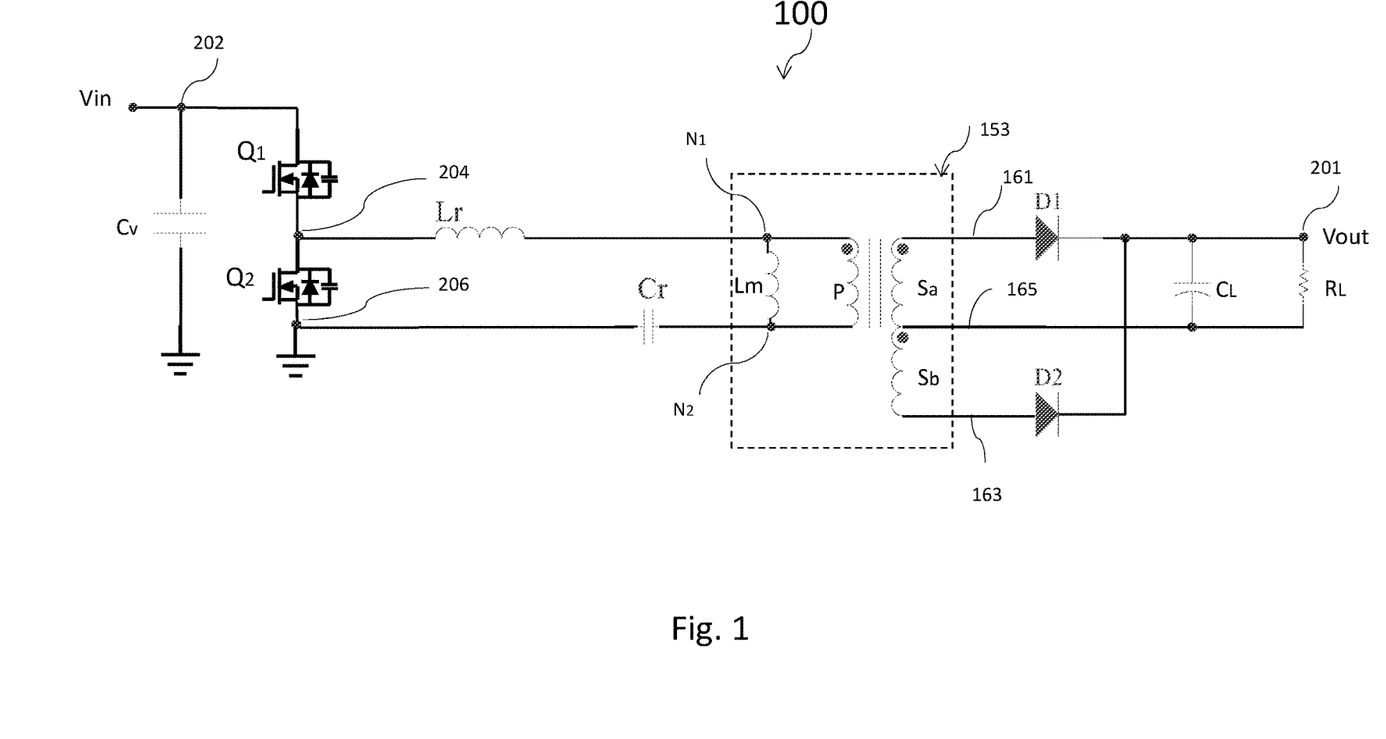
FIG. 1 illustrates a schematic of an embodiment LLC power converter.

Turning initially to FIG. 1, illustrated is a schematic drawing of an embodiment of resonant half-bridge LLC power converter 100. Input port 202 is coupled to an input voltage $V_{in}$, which may be a DC voltage supply. Capacitor $C_v$, which may be optional, is coupled between input port 202 and a reference voltage level (e.g., electrical ground). Capacitor $C_v$ may help to filter out high-frequency noise at input port 202. As illustrated in FIG. 1, in the primary side of the circuit, the half-bridge LLC converter has two series-coupled power switches, e.g., MOSFETs $Q_1$ and $Q_2$. Power switch $Q_1$ is coupled between a power supply node (e.g., input port 202) and power switch $Q_2$, and is sometimes referred to as the high-side switch or high-side transistor. Power switch $Q_2$ is coupled between power switch $Q_1$ and a reference voltage node 206, and is sometimes referred to as the low-side switch or low-side transistor. Power switches $Q_1$ and $Q_2$ are sometimes collectively referred to as the switching bridge of the LLC converter. Node 204, which is coupled to the source of high-side switch $Q_1$ and the drain of low-side switch $Q_2$ in FIG. 1, is sometimes referred to as switching node 204. While in the illustrated embodiment the power train employs a half-bridge resonant power converter topology, those skilled in the art should understand that other converter topologies such as a full-bridge power converter topology are well within the broad scope of the present invention.

As illustrated in FIG. 1, the switching bridge is coupled to resonant inductor $L_r$, resonant capacitor $C_r$, and transformer 153. Transformer 153 includes primary winding P, second winding S (e.g., winding portions $S_a$ and $S_b$), in some embodiments. In the example of FIG. 1, the primary side of transformer 153 is shown as primary winding P coupled in parallel with a magnetizing inductor $L_m$. In some embodiments, magnetizing inductor $L_m$ illustrated in FIG. 1 represents the magnetizing inductance $L_m$ of primary winding P of transformer 153, thus is not a stand-alone inductor separate from primary winding P. Skilled artisans will readily appreciate that for analysis and modeling of the LLC converter, it is customary to show the primary winding of transformer 153 as a magnetizing inductor $L_m$ coupled in parallel to a primary winding P, as illustrated in FIG. 1. Resonant inductor $L_r$, resonant capacitor $C_r$, and magnetizing inductor $L_m$ form an LLC tank, in various embodiments. An LLC tank may be referred to as an LLC tank circuit, or an LLC resonant tank in the discussion hereinafter. As shown that resonant capacitor $C_r$ in FIG. 1 is coupled between node 206 (e.g., electrical ground) and node $N_2$ of the primary winding P. Such a placement of resonant capacitor $C_r$ may advantageously reduce radiated EMI because resonant capacitor $C_r$ is not floating, and may also advantageously enable capacitive sensing of the current. In other embodiments, resonant capacitor $C_r$ is coupled between resonant inductor $L_r$ and node $N_1$ of primary winding P.

Referring to FIG. 1, secondary winding S of transformer 153 includes a first winding portion $S_a$ and a second winding portion $S_b$. A first terminal 161 of the secondary winding, sometimes referred to as a tap 161, is coupled to a first end of secondary winding S. A second terminal 163 is coupled to a second end of secondary winding S. A third terminal 165 is between the first terminal 161 and second terminal 163 of secondary winding S. For example, third terminal 165 may be a center tap of the secondary winding. Diodes $D_1$ and $D_2$ are secondary side rectifier diodes. In alternative embodiments, synchronous rectifier power switches may be employed in place of diodes $D_1$ and $D_2$. Diodes $D_1$ and $D_2$ form a full-wave rectifier that converts the output of transformer 153 into a DC voltage. The DC voltage is filtered by output capacitor $C_L$ and sent to output port 201 coupled to a load $R_L$, in some embodiments. In other embodiments, a full-bridge rectifier may be used which includes four diodes. Full-bridge rectifiers and full-wave rectifiers have different advantages and disadvantages, and choice of each type of rectifier are determined by design requirements and factors such as total diode conduction loss, secondary winding copper loss, component count and cost.

Figure 2:
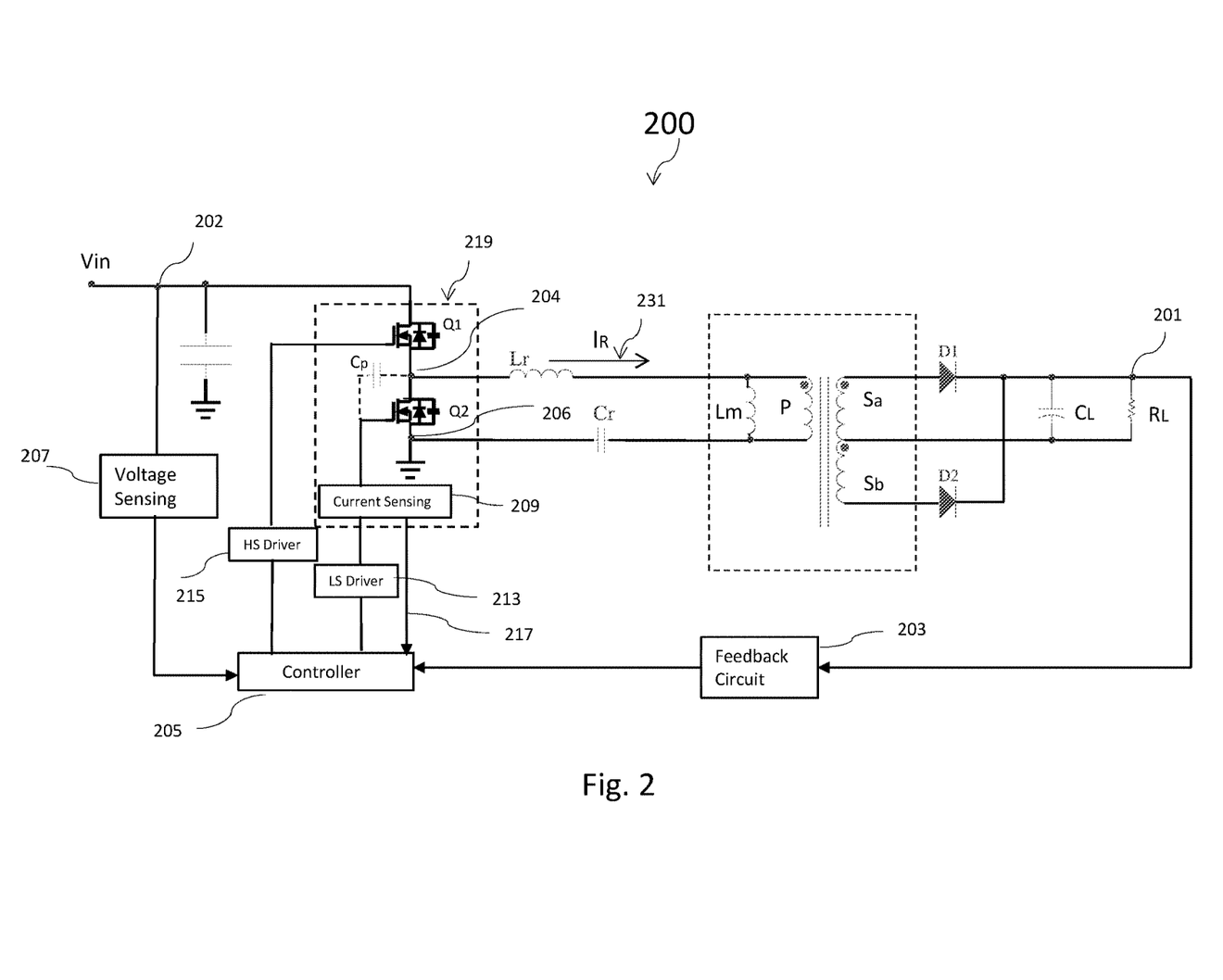
FIG. 2 illustrates an exemplary diagram for a power system having an LLC converter, in some embodiments.

Operation of LLC converter 100 is discussed hereinafter with reference to FIGS. 2-4. FIG. 2 illustrates an embodiment power conversion system 200 using LLC converter 100 shown in FIG. 1. As illustrated in FIG. 2, power conversion system 200 also includes a controller 205, a high-side driver 215, a low-side driver 213, a current sensing circuit 209, a feedback circuit 203, and an optional voltage sensing circuit 207. Controller 205 may be or include an integrated circuit (IC), e.g., a micro-processor unit, and may also include peripheral circuits such as comparator circuits, analog-to-digital converters (ADCs) and/or digital-to-analog converters (DACs). The comparator circuits, ADCs and/or DACs may be integrated with the micro-processor unit into one IC for higher level of integration. In other embodiments, the micro-processor unit is not integrated with peripheral circuits such as comparators, ADCs and DACs. Besides ICs, any other suitable controllers may also be used as controller 205.

In some embodiments, controller 205 generates control waveforms (e.g., square waveforms) to turn on and off power switches $Q_1$ and $Q_2$. Generation of the control waveforms may be controlled by control algorithms that are stored in memories (e.g., non-volatile memories) of the controller 205 and are executed by controller 205. The control signal of controller 205 may not have the appropriate voltage and/or driving capability to drive high-side switch $Q_1$ and low-side switch $Q_2$. Therefore, driver circuits such as high-side driver 215 and low-side driver 213 may be used to convert the output of controller 205 (e.g., control waveforms) into signals capable of driving high-side switch $Q_1$ and low-side switch $Q_2$. In the illustrated embodiment, the control waveforms for high-side switch $Q_1$ and low-side switch $Q_2$ are sent to high-side driver 215 and low-side driver 213, respectively. The output of the high-side driver 215 is coupled to the gate of high-side switch $Q_1$, and the output of low-side driver 213 is coupled to the gate of low-side switch $Q_2$ via current sensing circuit 209, as illustrated in FIG. 2.

In some embodiments, high-side driver 215 and low-side driver 213 are formed using discrete components such as operational amplifier, logic gates, resistors, capacitors, and the like. In other embodiments, high-side driver 215 and low-side driver 213 are implemented as integrated circuits (ICs). In yet other embodiments, controller 205, high-side driver 215 and low-side driver 213 are integrated in one IC, thus achieving higher level of integration.

As illustrated in FIG. 2, power system 200 further includes feedback circuit 203 that is employed to transmit a sensed output characteristic across the isolation boundary provided by power transformer 153 to controller 205. Feedback circuit 203 may be configured to provide a measurement or an estimate of the output voltage $V_{out}$ at output port 201 of the LLC converter. The measurement or estimate may be an analog signal or digital signal. Various circuit devices such as an opto-isolator to provide this isolation function are well known in the art and may be used as the feedback circuit, thus will not be described further herein. The optional voltage sensing circuit 207, if used, provides controller 205 with an estimate or a measurement of the input voltage $V_{in}$, which may be used by the control algorithms of controller 205 to determine, e.g., the switching frequency of the LLC converter.

FIG. 2 also illustrates a current sensing circuit 209 coupled between controller 205 and the gate of power switch $Q_2$. Current sensing circuit 209 detects current pulses (e.g., electrical current lasting for short period of time) flowing into or out of the gate of power switch $Q_2$, in some embodiments. The output 217 of current sensing circuit 209 is sent to controller 205 and may be used by the control algorithms of controller 205 to determine the switching of the LLC converter. More details regarding the structure and operation of current sensing circuit 209 are discussed hereinafter with reference to FIGS. 3-4.

During operation, controller 205 switches power switches $Q_1$ and $Q_2$ on and off alternately to generate a time-varying waveform (e.g., a square waveform) to excite the LLC resonant tank, in some embodiments. The LLC tank circuit generates a resonant current (e.g., a resonant sinusoidal current) in the primary side of the LLC converter, which resonant current is scaled by transformer 153 and rectified by the rectifier circuit (e.g., diodes $D_1$ and $D_2$). The gain K of the resonant tank circuit is given by Equation (1) below:

$$K(Q, m, F_x) = \frac{F_x^2(m-1)}{\sqrt{(mF_x^2 - 1)^2 + F_x^2(F_x^2 - 1)^2(m-1)^2 Q^2}} \quad (1)$$

where $$Q = \frac{\sqrt{L_r/C_r}}{R_{ac}}$$

is the quality factor (Q-factor), $$R_{ac} = \frac{8n^2 R_L}{\pi^2}$$

is the reflected load resistance, with $R_L$ being the load resistance and n being the turns ratio of primary over secondary, $$f_r = \frac{1}{2\pi\sqrt{L_r C_r}}$$

is the resonant frequency, $$F_x = \frac{f_s}{f_r}$$

is the normalized switching frequency, with $f_s$ being the switching frequency, and $$m = \frac{L_r + L_m}{L_r}$$

is the ratio of total primary inductance to resonant inductance. Based on Equation (1), gain curves showing gain K versus normalized switching frequency $F_x$ can be plotted for a given quality factor Q and ratio of total primary inductance to resonant inductance m. Such gain curves typically show a peak gain at $F_x=1$ (e.g., when switching frequency $f_s$ is equal to resonant frequency $f_r$), with gain K increasing monotonically with decreasing switching frequency $f_s$ for $f_s > f_r$. Skilled artisans will appreciate that while Equation (1) gives a model for the analysis of the LLC resonant converter, other models are also possible. In addition, Equation (1) may be used to provide an estimation/prediction of the performance of the LLC resonant converter, and the performance of the LLC resonant converter may not match exactly with the estimation/prediction offered by Equation (1).

Still referring to FIG. 2, power system 200 includes an LLC resonant converter coupled to an input voltage source $V_{in}$, and controller 205 that regulates a power converter output characteristic such as an output voltage $V_{out}$ by regulating a switching frequency $f_s$ of the LLC power converter. The output voltage $V_{out}$ at output port 201 of the LLC power converter may fluctuate due to, e.g., a load change or a drop in input voltage V. Controller 205 together with feedback circuit 203 senses the output voltage $V_{out}$ of the power converter, and based on a target output voltage $V_{ref}$, controls switching frequency $f_s$ of the primary-side power switches (e.g., switches $Q_1$ and $Q_2$) to regulate the output voltage $V_{out}$ at the desired output voltage $V_{ref}$. Equation (1) above shows that gain K of an LLC converter could be adjusted by changing switch frequency $f_s$ of the LLC power converter. For example, when output voltage $V_{out}$ is above desired output voltage $V_{ref}$, controller 205 may decrease gain K by increasing switching frequency $f_s$ of the LLC power converter. Conversely, when output voltage $V_{out}$ is below desired output voltage $V_{ref}$, controller 205 may increase gain K by reducing switching frequency $f_s$ of the LLC power converter.

LLC power converters often operate in the inductive mode, since advantageous features such as zero voltage switching (ZVS) is achieved in the inductive mode. Capacitive mode operation may be problematic for LLC converters, due to issues such as reverse recovery of the body diodes of the power switches (e.g., MOSFETs). However, depending on various factors such as the load, the operating frequency, and parameters of the components of the LLC tank, the LLC converter may enter capacitive mode during operation. The LLC converter may also enter capacitive mode under fault conditions, like output short circuit or AC power loss. Embodiments of the present disclosure, as discussed hereinafter with reference to FIGS. 3, 4A, and 4B, provide methods to detect entry into capacitive mode, and in the event of LLC converter entering capacitive mode, provide a switching method that allows operation of LLC converter in capacitive mode with no risk or reduced risk of reverse recovery.

Figure 3:
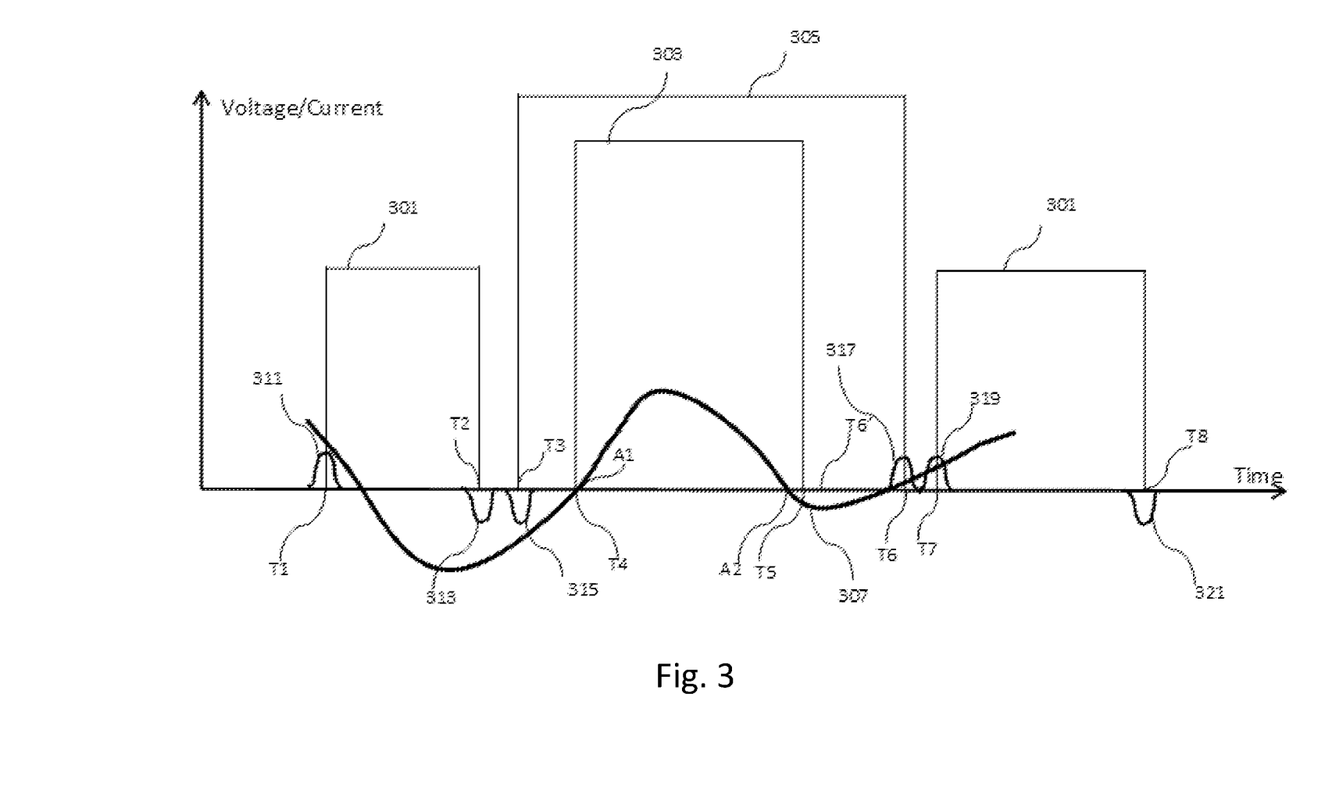
FIG. 3 illustrates a timing diagram for operating the LLC converter of FIG. 2 in capacitive mode using an embodiment switching method.

FIG. 3 shows the timing diagram for the switching of power switches $Q_1$ and $Q_2$ using an embodiment switching method in a capacitive mode, in accordance with an embodiment of the present disclosure. In FIG. 3, curve 301 illustrates the gate voltage (e.g., voltage at the gate) of low-side transistor $Q_2$, curve 303 illustrates the gate voltage of high-side transistor $Q_1$, and curve 305 illustrates the voltage at switching node 204 (see FIG. 2). The curves 311/313/315/317/319 each illustrates a small current pulse (e.g., an electrical current lasting for a short period such as between about 10 ns to about 500 ns) that flows into or out of the gate of low-side transistor $Q_2$. In FIG. 3, a positive current pulse indicates an electrical current that flows in a first direction from low-side driver 213 toward the gate of low-side transistor $Q_2$ (e.g., into the gate of low-side transistor $Q_2$), and a negative current pulse indicates an electrical current that flows in a second direction from the gate of low-side transistor $Q_2$ toward low-side driver 213 (e.g., out of the gate of low-side transistor $Q_2$). In addition, curve 307 in FIG. 3 illustrates the tank current $I_R$ (see FIG. 2). In FIG. 3, a positive tank current $I_R$ indicates that tank current $I_R$ is flowing in the LLC tank along direction 231 (see FIG. 2), and a negative tank current $I_R$ indicates that tank current $I_R$ is flowing in the LLC tank along the opposite direction of 231.

Referring to FIG. 3, at time T1, controller 205 changes the gate voltage of low-side transistor $Q_2$ (e.g., a power MOSFET) from low (e.g., around electrical ground) to high (e.g., a few volts) to turn on low-side transistor $Q_2$ (e.g., forming a low-resistance electrical conductive path between the source and the drain of transistor $Q_2$). A positive current pulse 311, which corresponds to the charging current that charges the gate-source capacitance of $Q_2$ to turn on $Q_2$, occurs at time T1. Current pulse 311 lasts between about 10 ns to about 500 ns, such as 100 ns, in some embodiments. The peak value (e.g., max value) of current pulse 311 is above a first threshold, which may be between about 100 uA to about 100 mA, in various embodiments. Other durations and peak values for current pulse 311 are also possible, depending on, e.g., the type of power transistor $Q_2$ used, the load condition, and/or operating frequency.

Next, at time T2, controller 205 changes the gate voltage of $Q_2$ from high to low to turn off low-side transistor $Q_2$. As a result, a discharging current flows out of the gate of low-side transistor $Q_2$, thus causing a current pulse 313. Note that current pulse 313 is shown in FIG. 3 as a negative current pulse to indicate the direction of current flow for current pulse 313 (e.g., from the gate of low-side transistor $Q_2$ toward low-side driver 213), as described above. The absolute value of the amplitude of current pulse 313 and the duration of current pulse 313 may be similar to those of current pulse 311. In some embodiments, pulses (e.g., 311, 313,319,321) due to gate drive activity have a same or similar duration and a same or similar absolute amplitude (e.g., absolute peak amplitude). Compared with the pulses (e.g., 315, 317 discussed below) due to drain voltage variation, the pulses (e.g., 311, 313, 319, 321) due to gate drive activity may have much larger absolute amplitudes, e.g., from 100 mA to 5 A, such as 500 mA. In contrast, the pulses (e.g., 315, 317) due to drain voltage variation may be in a range from about 100 μA to about 100 mA. In some embodiments, gate drive activity related pulses (e.g., 311, 313,319,321) have longer duration (e.g., between about 20 ns and about 1 us, such as 200 ns) than drain voltage variation related pulses (e.g., 315, 317), which may have a duration between about 100 ns and about 1 μs.

Next, at time A1, tank current $I_R$ changes direction from negative to positive. The positive tank current $I_R$ flows through the drain-source capacitance of high-side transistor $Q_1$, and thus, charges capacitor Cr. As a result, the voltage at switching node 204, which was low (e.g., around electrical ground) before, increases to a high voltage value (e.g., around supply voltage $V_{in}$ in FIG. 2), as indicated by the rising edge of curve 305 at time T3. Due to the high voltage at switching node 204, a leakage current flows from switching node 204 toward the gate of low-side transistor $Q_2$ via the drain-gate capacitance $C_p$, and flows out of the gate of low-side transistor $Q_2$ toward low-side driver 213, in some embodiments. Therefore, a negative current pulse 315 occurs at the gate of low-side transistor $Q_2$ at time T3. The time interval between T3 and T2 may be between about 100 ns to about 2 us, in some embodiments. The time interval between T3 and A1 may be between about 0 ns to about 25 us, in some embodiments. Note that the drain-gate capacitance $C_p$ is a parasitic capacitance, thus is not a stand-alone capacitor. FIG. 2 shows the drain-gate capacitance $C_p$ merely for the purpose of facilitating the discussion herein.

Negative pulse 315, like other current pulses (e.g., 311/313/317/319/321), may be detected using current sensing circuit 209. FIGS. 4A and 4B illustrate a block diagram of a current sensing circuit 300 and a block diagram of a sensing circuit 300A, respectively, which may be used as current sensing circuit 209 in FIG. 2. As illustrated in FIG. 4A, current sensing circuit 300 has a input terminal 301, which may be coupled to low-side driver 213 in FIG. 2. Current sensing circuit 300 has a second terminal 303, which may be coupled to the gate of low-side transistor $Q_2$ in FIG. 2. A resistor 305 is coupled between terminal 301 and terminal 303, and converts the current flowing into or out of the gate of low-side transistor $Q_2$ into a voltage $V_1$ across resistor 305. In some embodiments, the resistance of resistor 305 is between about 10Ω to about 1 kΩ. An electrical current flowing in direction 331 is converted into a positive voltage drop across resistor 305 in direction 331, and conversely, an electrical current flowing in the opposite direction of 331 is converted into a negative voltage drop across resistor 305 in the direction of 331.

Figure 4A:
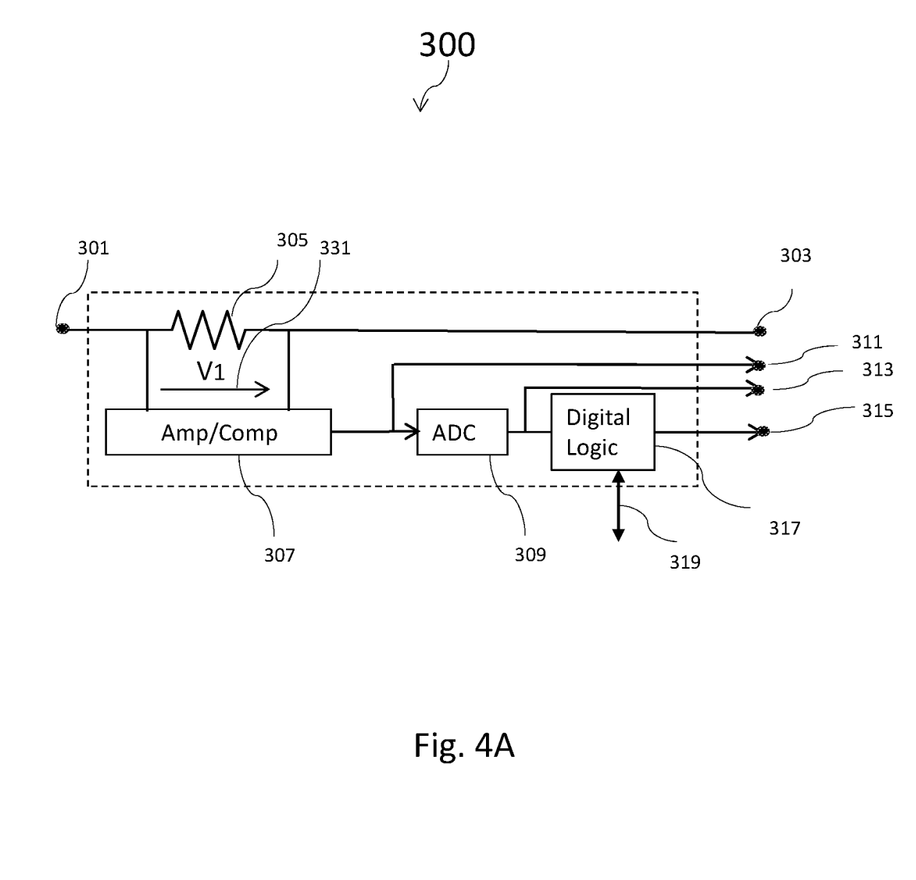
FIGS. 4A and 4B illustrate block diagrams for two different embodiment current sensing circuits.

As illustrated in FIG. 4A, amplifier 307 (which may comprise an operational amplifier, a comparator, or the like) amplifies the voltage drop (e.g., positive voltage drop or negative voltage drop) across resistor 305 along direction 331 for further processing. In some embodiments, the amplified voltage drop is sent out at output terminal 311 to controller 205 for further processing. Controller 205 may convert the analog voltage signal into digital data using ADCs that are integrated within controller 205. Controller 205 may run algorithms that detect positive or negative current pulses from the digitized voltage signal. In other embodiments, the amplified voltage drop is converted into digital data by an ADC module 309 of current sensing circuit 300, and the digitized voltage signal is sent via output terminal 313 to controller 205 for detection of current pulses. In yet other embodiments, current sensing circuit 300 has a digital logic 317, which performs detection of positive or negative current pulses using the digitized voltage signal. Digital logic 317 may have an interface 319 that is used to control the operation of digital logic 317. For example, controller 205 may send parameters used by digital logic 317 for detection of current pulses (e.g., lower threshold of voltage signal to trigger current pulse detection, detection window size, and so on) via interface 319. The detection results, which are digital data, are sent out at output terminal 315 to controller 205. Each one of output ports 311/313/315 in FIG. 4A may be used as output 217 in FIG. 2.

Digital logic 317 offloads controller 205 by performing the task of current pulse detection, thus saves processing capacity of controller 205 for other tasks. Other advantages may include lower power consumption, and the ability to interface with a wide selection of controllers (e.g., low-cost controllers with limited processing power). In some embodiments, current sensing circuit are integrated with the high-side transistor and low-side transistor in a same integrated circuit (IC). For example, current sensing circuit 209 and power switches $Q_1$ and $Q_2$ in FIG. 2 may be integrated together to form an IC 219.

Figure 4B:
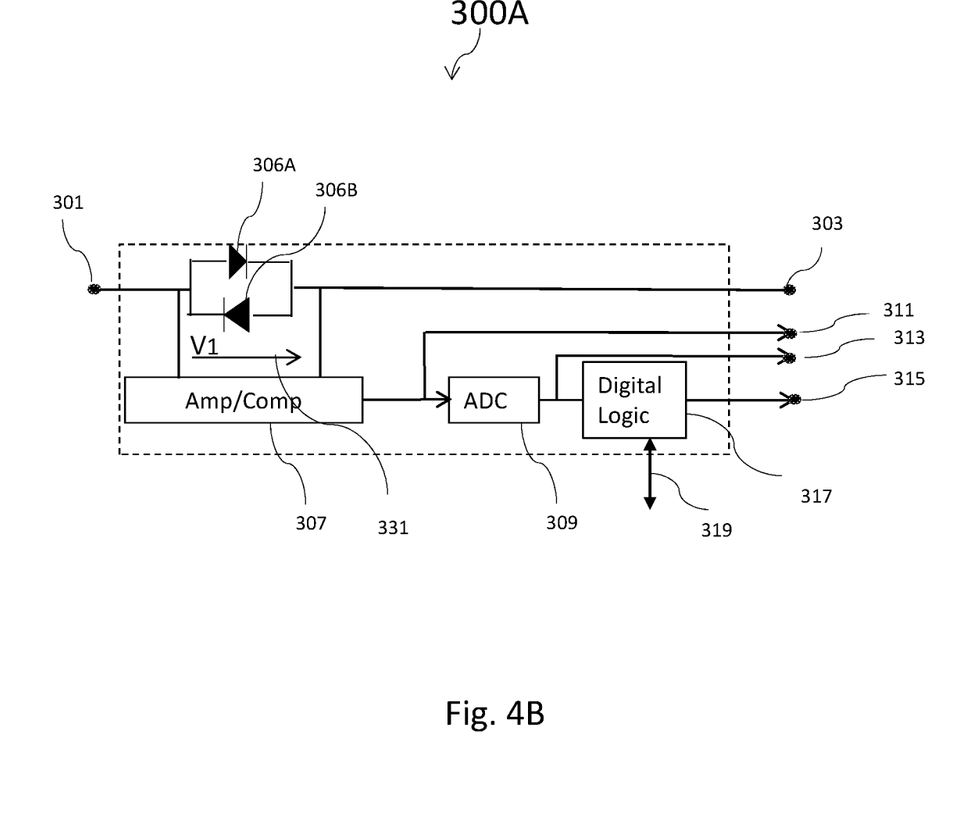

FIG. 4B illustrates a block diagram of another current sensing circuit 300A, in an embodiment. Sensing circuit 300A is similar to sensing circuit 300, but with resistor 305 replaced with a pair of anti-parallel diodes 306A and 306B. In addition, amplifier 307 in FIG. 4B may be a comparator, which may convert a positive or a negative voltage drop $V_1$ along direction 331 into a corresponding voltage level (e.g., a high voltage level such as a few volts or a low voltage level such as electrical ground). ADC 309 and digital logic 319 in the example of FIG. 4B are optional, and thus, may or may not be used, in some embodiments.

Referring back to FIG. 3, after negative current pulse 315 is detected, controller 205 changes the gate voltage of high-side transistor $Q_1$ from low (e.g., around electrical ground) to high (e.g., around supply voltage $V_{in}$ in FIG. 2) to turn on high-side transistor $Q_1$ at time T4, as indicated by the rising edge of curve 303 at time T4. The time interval between T3 and T4 may be between about 100 ns to about 2 us, in some embodiments, although other values are also possible. Since the voltage at switching node 204 is already high, no current pulse is generated by the switching on of high-side transistor $Q_1$ at time T4.

Next, at time T5, controller turns off high-side transistor $Q_1$. Note that tank current $I_R$ at time T5 is negative (e.g., flowing in opposite direction of 231), therefore, after high-side transistor $Q_1$ is turned off, negative tank current $I_R$ flows through the body diode of high-side transistor $Q_1$. As a result, the voltage at switching node 204 is still high, and therefore, no current pulse is generated at the gate of low-side transistor $Q_2$ at time T5. Note that after time T5, the LLC converter enters capacitive mode in the illustrated example.

In conventional LLC converter operation, the low-side transistor $Q_2$ may be turned on shortly after time T5, for example, at time T6' which may be about 200 ns to about 500 ns after T5 (e.g., same delay as the delay between time T2 and T3). Since the body diode of $Q_1$ is forward biased at time T6', and the voltage at switching node 204 is still high, turning on $Q_2$ at time T6' would pull the voltage at switching node 204 to electrical ground, thus causing a reverse recovery for the body diode of high-side transistor $Q_1$. Since Vin may be a relatively high voltage (e.g., about one hundred volts to a few hundred volts), the reverse recovery effect may cause serious damage or device failure of the power transistors.

Instead of switching at time T6', controller 205 wait for the detection of a positive current pulse 317 at time T6. The positive current pulse 317 occurs after the LLC tank current $I_R$ changes direction from negative to positive at time A2.

Since $Q_1$ is turned off, after time A2, the positive tank current $I_R$ flows through the body diode of low-side switch $Q_2$, thus pulling down the voltage at switching node 204 to low, as indicated by the falling edge of curve 305 at time T6. In some embodiments, the time interval between T5 and T6 is larger than about 2 μs, such as 10 ms. Due to the lower voltage at switching node 204, a positive current pulse 317 is generated flowing into the gate of low-side transistor $Q_2$ at time T6. Current pulse 317 may be used as an indication of entry of capacitive mode. The amplitude of current pulse 317 and the duration of current pulse 317 may be similar to those of current pulse 311.

Since the voltage at switching node 204 is already at low voltage (e.g., around electrical ground), low-side switch $Q_2$ can be turned on upon detection of current pulse 317 at time T6 without the risk of reverse recovery for high-side transistor $Q_1$, in some embodiments. In the illustrated embodiment, low-side switch $Q_2$ is turned on at time T7, with a corresponding current pulse 319 at time T7. The time interval between T6 and T7 is between about 100 ns to about 2 us, in various embodiments.

As discussed above, the embodiment switching method illustrated in FIG. 3 allows for detection of entry of capacitive mode, and allows for the LLC converter to survive (e.g., operate with reduced risk of critical damage) in capacitive mode.

Figure 5:
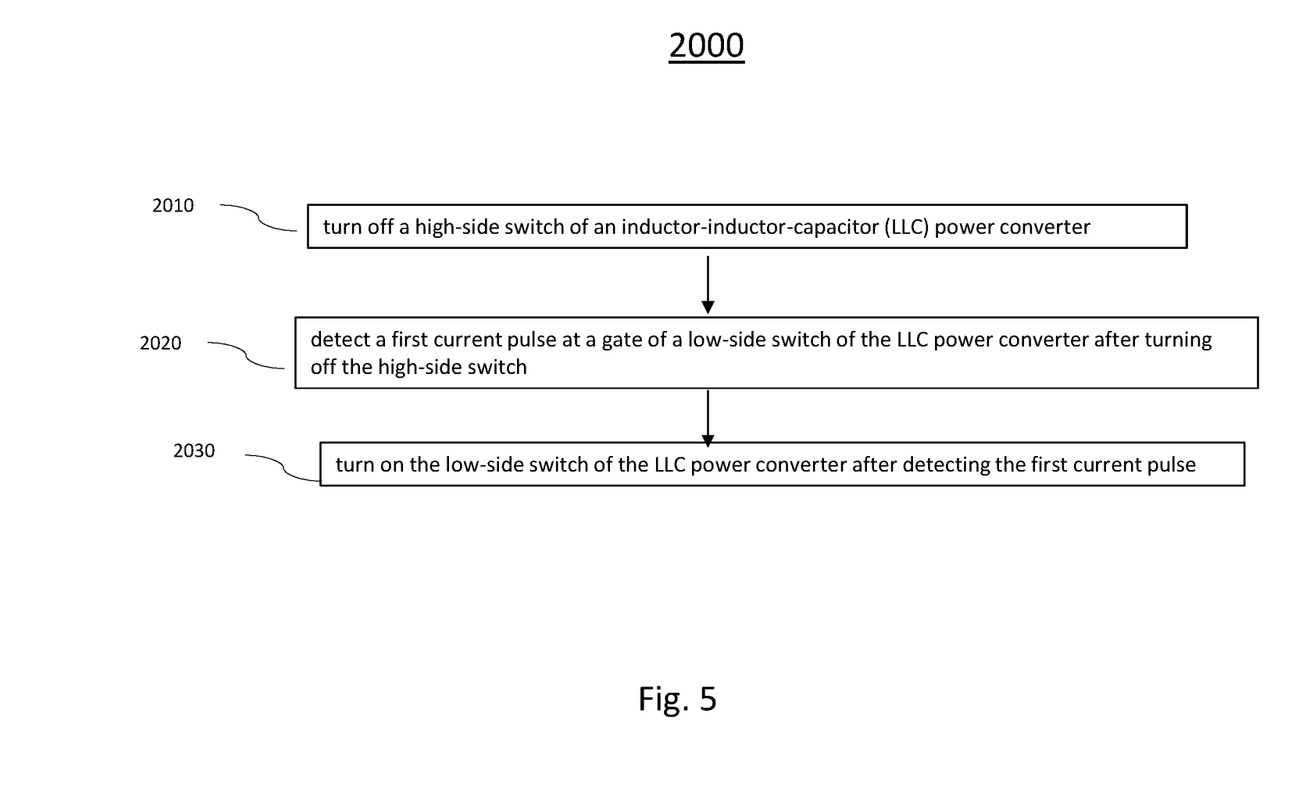
FIG. 5 illustrates a flow chart for a method of operating an LLC converter, in some embodiments.

FIG. 5 illustrates a flow chart of a method of operating an LLC converter, in accordance with some embodiments. It should be understood that the embodiment methods shown in FIG. 5 is merely an example of many possible embodiment methods. One of ordinary skill in the art would recognize many variations, alternatives, and modifications. For example, various steps as illustrated in FIG. 5 may be added, removed, replaced, rearranged and repeated.

Referring to FIG. 5, at step 2010, a high-side switch of an inductor-inductor-capacitor (LLC) power converter is turned off. The high-side switch may be a power transistor (e.g., MOSFET). At step 2020, a first current pulse is detected at a gate of a low-side switch of the LLC power converter after turning off the high-side switch. The first current pulse may be a positive current pulse (e.g., positive current pulse 317) that corresponds to a current flowing into the gate of the low-side switch. A time delay between turning off the high-side switch and the second current pulse may be larger than about 2 μs, e.g., 10 ms. At step 2030, the low-side switch of the LLC power converter is turned on after detecting the first current pulse. Turning on the low-side switch may generate a positive current pulse (e.g., positive current pulse 319).

Example embodiments of the present invention are summarized here. Other embodiments can also be understood from the entirety of the specification and the claims filed herein.

Example 1

A method including: turning off a high-side switch of an inductor-inductor-capacitor (LLC) power converter; detecting a first current pulse at a gate of a low-side switch of the LLC power converter after turning off the high-side switch; and turning on the low-side switch of the LLC power converter after detecting the first current pulse.

Example 2

The method of example 1, wherein the high-side switch comprises a first transistor and the low-side switch comprises a second transistor, wherein a drain of the high-side switch is coupled to a power supply node, a source of the high-side switch is coupled to a drain of the low-side switch, and a source of the low-side switch is coupled to a reference voltage node.

Example 3

The method of examples 1 or 2, wherein detecting the first current pulse comprises detecting a first current that flows in a first direction from a driver circuit of the low-side switch toward the gate of the low-side switch.

Example 4

The method of one of examples 1-3, wherein detecting the first current pulse comprises detecting the first current having a peak value larger than a first current threshold.

Example 5

The method of example 4, wherein the first current threshold is between about 0.1 mA and about 100 mA.

Example 6

The method of one of examples 1-3, wherein detecting the first current pulse comprises detecting the first current pulse 2 µs or more after turning off the high-side switch.

Example 7

The method of one of examples 1-3, wherein detecting the first current pulse comprises measuring a first voltage across a resistor coupled between the gate of the low-side switch and the driver circuit of the low-side switch.

Example 8

The method of example 7, wherein the resistor is integrated into a same integrated circuit as the low-side switch.

Example 9

The method of one of examples 1-3, further comprising, prior to the turning off the high-side switch: detecting a second current pulse at the gate of the low-side switch; and turning on the high-side switch after detecting the second current pulse.

Example 10

The method of example 9, wherein detecting the second current pulse comprises detecting a second current that flows in a second direction from the gate of the low-side switch toward the driver circuit of the low-side switch.

Example 11

The method of example 10, wherein detecting the second current pulse comprises detecting the second current having a peak value of larger than a second current threshold.

Example 12

The method of example 11, wherein the second current threshold is between about 0.1 mA and about 100 mA.

Example 13

The method of example 11, further comprising detecting a third current pulse a second time period before detecting the second current pulse.

Example 14

The method of example 13, wherein the second time period is between about 200 ns to about 500 ns.

Example 15

The method of claim 13, wherein detecting the third current pulse comprises detecting a third current that flows in the second direction from the gate of the low-side switch toward the driver circuit of the low-side switch.

Example 16

A controller in a half-bridge inductor-inductor-capacitor (LLC) power converter system having a high-side transistor and a low-side transistor, the controller configured to: switch the high-side transistor off; detect a first current pulse at a gate of the low-side transistor after switching the high-side transistor off; and upon detecting the first current pulse, switch the low-side transistor on.

Example 17

The controller of example 16, wherein detecting the first current pulse comprises detecting a first current that flows into the gate of the low-side transistor.

Example 18

The controller of example 16 or 17, wherein the first current has a peak value that is larger than a first threshold, wherein the first threshold is between about 0.1 mA and about 100 mA.

Example 19

The controller of one of examples 16-18, wherein detecting the first current pulse comprises detecting the first current pulse about 2 µs or more after switching the high-side transistor off.

Example 20

The controller of example 16 or 17, wherein the controller is further configured to, prior to the switching the high-side transistor off: detect a second current pulse at the gate of the low-side transistor; and switching the high-side transistor on after detecting the second current pulse.

Example 21

The controller of example 20, wherein detecting the second current pulse comprises detecting a second current flowing out of the gate of the low-side transistor.

Example 22

The controller of example 21, wherein switching the high-side transistor on comprises switching the high-side transistor on 2 µs or more after detecting the second current pulse.

Example 23

A power system including: an inductor-inductor-capacitor (LLC) converter including: a switching bridge comprising a high-side transistor and a low-side transistor; an LLC tank coupled to the switching bridge, the LLC tank comprising a first inductor, a first capacitor, and a second inductor; a transformer coupled to the LLC tank, the transformer comprising a primary winding and a secondary winding; and a controller coupled to the high-side transistor and the low-side transistor, wherein the controller is configured to: turn off the high-side transistor; detect a first current pulse at a gate of the low-side transistor after turning off the high-side transistor; and turn on the low-side transistor after detecting the first current pulse.

Example 24

The power system of example 23, wherein the controller is further configured to, prior to turning off the high-side transistor: detect a second current pulse at the gate of the low-side transistor; and turn on the high-side transistor after detecting the second current pulse.

Example 25

The power system of example 24, wherein detecting the first current pulse comprises detecting a first current that flows into the gate of the low-side transistor, and wherein detecting the second current pulse comprises detecting a second current that flows out of the gate of the low-side transistor.

Example 26

The power system of example 25, wherein a first time interval between turning off the high-side transistor and detecting the first current pulse is larger than about 2 µs, wherein a second time interval between detecting the second current pulse and turning on the high-side transistor is between about 200 ns to about 500 ns.

Example 27

The power system of example 26, further comprising a current sensing circuit coupled between the controller and the gate of the low-side transistor.

Example 28

The power system of example 27, wherein the current sensing circuit comprises a resistor coupled between the gate of the low-side transistor and a driver circuit of the low-side transistor.

Advantages of embodiments of the present invention include improved ability to operate an LLC power converter safely in capacitive mode without the risk of reverse recovery and device failure. The disclosed switching method protects the power switches (e.g., power MOSFETs) of the LLC power converter from destructive events. Various operating conditions such as output short circuit, hold up time with small power factor correction (PFC) capacitors, and load jump may lead to destructive events such as reverse recovery of the body diode of power MOSFETs, the embodiment methods allow for safe operation of LLC power converters under these conditions. Embodiments of the present disclosure detects current pulses at the gate of the low-side transistor using a current sensing circuit, since the current sensing circuit may also be used for operation in inductive mode, no additional hardware may be needed for implementing the methods disclosed in the present disclosure.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A method comprising:
    detecting a second current pulse at a gate of a low-side switch of an inductor-inductor-capacitor (LLC) power converter, wherein detecting the second current pulse comprises detecting a second current that flows in a second direction from the gate of the low-side switch toward a driver circuit of the low-side switch;
    turning on a high-side switch of the LLC power converter after detecting the second current pulse;
    turning off the high-side switch of the LLC power converter after turning on the high-side switch;
    detecting a first current pulse at the gate of the low-side switch of the LLC power converter after turning off the high-side switch, wherein detecting the first current pulse comprises detecting a first current that flows in a first direction from the driver circuit of the low-side switch toward the gate of the low-side switch; and
    turning on the low-side switch of the LLC power converter after detecting the first current pulse.

2. The method of claim 1, wherein the high-side switch comprises a first transistor and the low-side switch comprises a second transistor, wherein a drain of the high-side switch is coupled to a power supply node, a source of the high-side switch is coupled to a drain of the low-side switch, and a source of the low-side switch is coupled to a reference voltage node.

3. The method of claim 1, wherein detecting the first current pulse comprises detecting the first current having a peak value larger than a first current threshold.

4. The method of claim 3, wherein the first current threshold is between about 0.1 mA and about 100 mA.

5. The method of claim 1, wherein detecting the first current pulse comprises detecting the first current pulse 2 µs or more after turning off the high-side switch.

6. The method of claim 1, wherein detecting the first current pulse comprises measuring a first voltage across a resistor coupled between the gate of the low-side switch and the driver circuit of the low-side switch.

7. The method of claim 6, wherein the resistor is integrated into a same integrated circuit as the low-side switch.

8. The method of claim 1, wherein detecting the second current pulse comprises detecting the second current having a peak value of larger than a second current threshold.

9. The method of claim 8, wherein the second current threshold is between about 0.1 mA and about 100 mA.

10. The method of claim 8, further comprising detecting a third current pulse a time period before detecting the second current pulse.

11. The method of claim 10, wherein the time period is between about 200 ns to about 500 ns.

12. The method of claim 10, wherein detecting the third current pulse comprises detecting a third current that flows in the second direction from the gate of the low-side switch toward the driver circuit of the low-side switch.

13. A controller in a half-bridge inductor-inductor-capacitor (LLC) power converter system having a high-side transistor and a low-side transistor, the controller configured to:
    detect a second current pulse at a gate of the low-side transistor, wherein detecting the second current pulse comprises detecting a second current flowing out of the gate of the low-side transistor;
    switching the high-side transistor on after detecting the second current pulse;
    switch the high-side transistor off after switching the high-side transistor on;
    detect a first current pulse at the gate of the low-side transistor after switching the high-side transistor off, wherein detecting the first current pulse comprises detecting a first current that flows into the gate of the low-side transistor; and
    upon detecting the first current pulse, switch the low-side transistor on.

14. The controller of claim 13, wherein the first current has a peak value that is larger than a first threshold, wherein the first threshold is between about 0.1 mA and about 100 mA.

15. The controller of claim 14, wherein detecting the first current pulse comprises detecting the first current pulse about 2 µs or more after switching the high-side transistor off.

16. The controller of claim 13, wherein switching the high-side transistor on comprises switching the high-side transistor on 2 µs or more after detecting the second current pulse.

17. The controller of claim 13, wherein the second current has a peak value that is larger than a second threshold, wherein the second threshold is between about 0.1 mA and about 100 mA.

18. The controller of claim 13, further configured to detect a third current pulse a time period before detecting the second current pulse.

19. The controller of claim 18, wherein the time period is between about 200 ns to about 500 ns.

20. The controller of claim 18, wherein detecting the third current pulse comprises detecting a third current that flows out of the gate of the low-side transistor.

21. The controller of claim 13, further configured to, upon detecting the first current pulse, declare that the half-bridge LLC power converter system enters a capacitive mode.

22. The controller of claim 13, further configured to:
    monitor an output voltage of the half-bridge LLC power converter system; and
    adjust a switching frequency of the half-bridge LLC power converter system in accordance with the output voltage.

23. A power system comprising:
    an inductor-inductor-capacitor (LLC) converter comprising:
        a switching bridge comprising a high-side transistor and a low-side transistor;
        an LLC tank coupled to the switching bridge, the LLC tank comprising a first inductor, a first capacitor, and a second inductor;
        a transformer coupled to the LLC tank, the transformer comprising a primary winding and a secondary winding; and
    a controller coupled to the high-side transistor and the low-side transistor, wherein the controller is configured to:
        detect a second current pulse at a gate of the low-side transistor, wherein detecting the second current pulse comprises detecting a second current that flows out of the gate of the low-side transistor;
        turn on the high-side transistor after detecting the second current pulse;
        turn off the high-side transistor after turning on the high-side transistor;
        detect a first current pulse at the gate of the low-side transistor after turning off the high-side transistor, wherein detecting the first current pulse comprises detecting a first current that flows into the gate of the low-side transistor; and
        turn on the low-side transistor after detecting the first current pulse.

24. The power system of claim 23, wherein a first time interval between turning off the high-side transistor and detecting the first current pulse is larger than about 2 µs, wherein a second time interval between detecting the second current pulse and turning on the high-side transistor is between about 200 ns to about 500 ns.

25. The power system of claim 24, further comprising a current sensing circuit coupled between the controller and the gate of the low-side transistor.

26. The power system of claim 25, wherein the current sensing circuit comprises a resistor coupled between the gate of the low-side transistor and a driver circuit of the low-side transistor.

27. The power system of claim 25, wherein the current sensing circuit comprises a pair of anti-parallel diodes coupled between the gate of the low-side transistor and a driver circuit of the low-side transistor.

28. The power system of claim 24, wherein a drain of the high-side transistor is coupled to a power supply node, a source of the high-side transistor is coupled to a drain of the low-side transistor, and a source of the low-side transistor is coupled to a reference voltage node.

* * * * *